June 14, 1927.

J. HOLM 1,632,006

RECORDING WEIGHING MECHANISM

Filed July 11, 1921     7 Sheets-Sheet 1

INVENTOR
John Holm.

BY HIS ATTORNEY

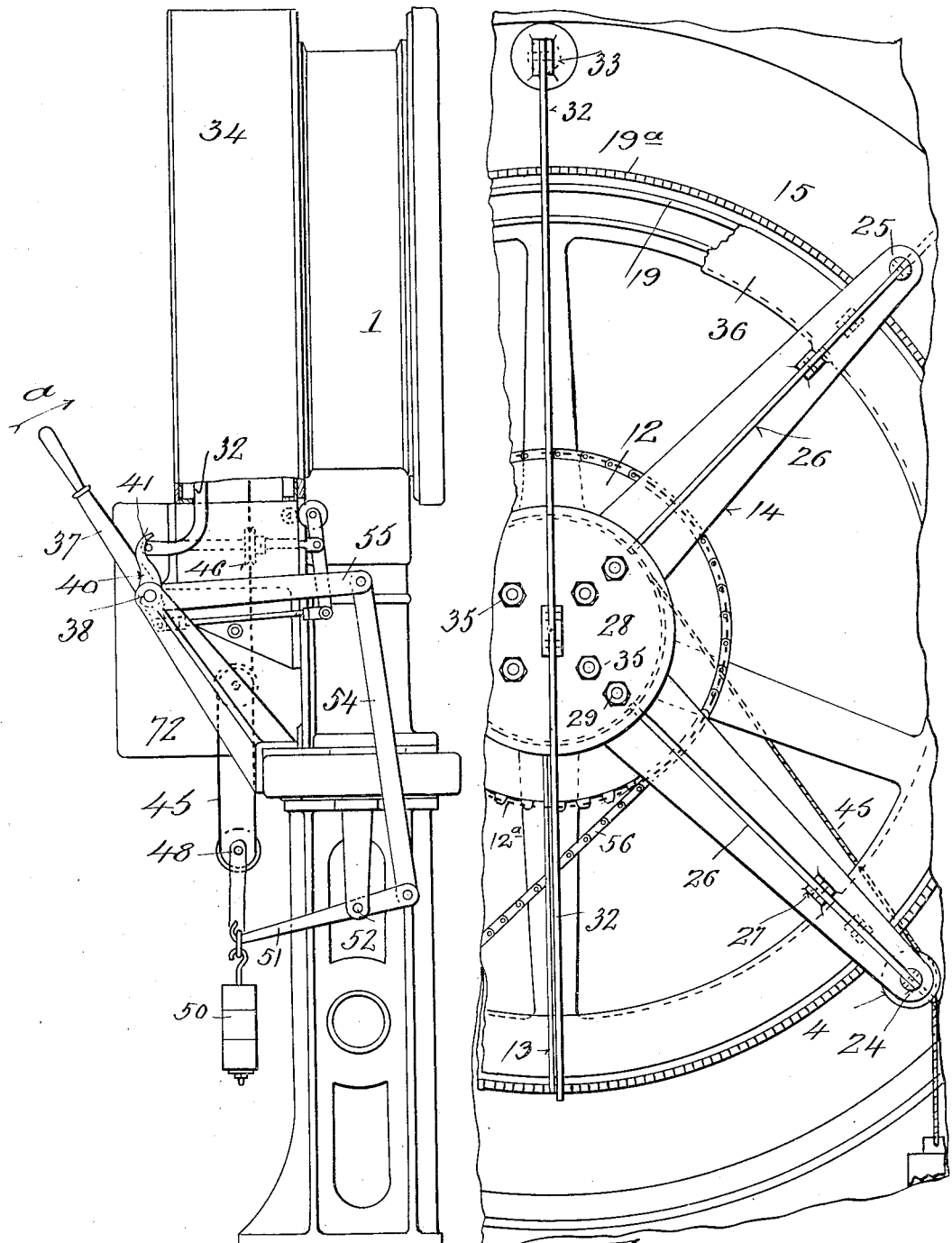

June 14, 1927.

J. HOLM 1,632,006

RECORDING WEIGHING MECHANISM

Filed July 11, 1921

7 Sheets-Sheet 4

INVENTOR
John Holm

BY HIS ATTORNEY
J. F. Bourne

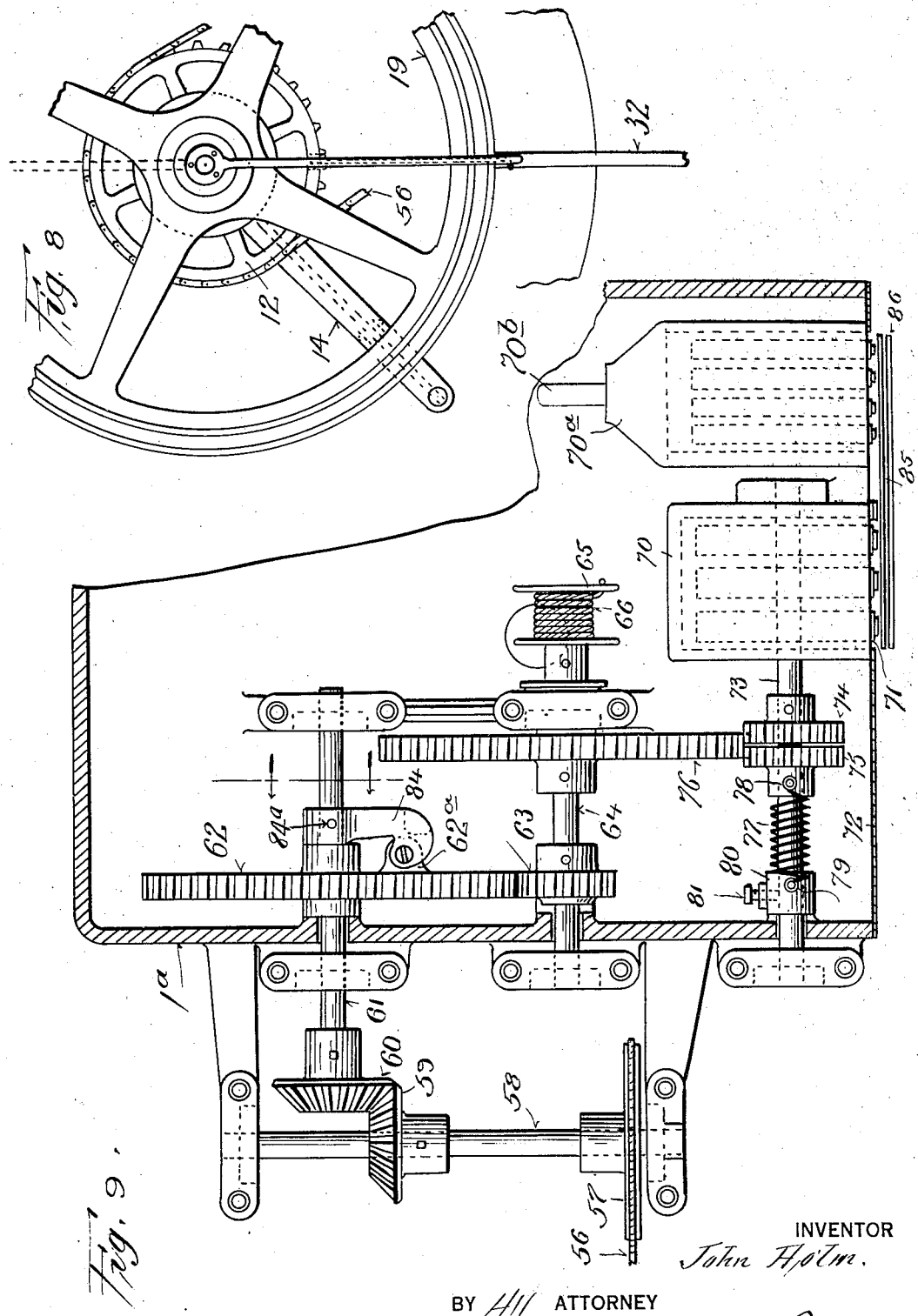

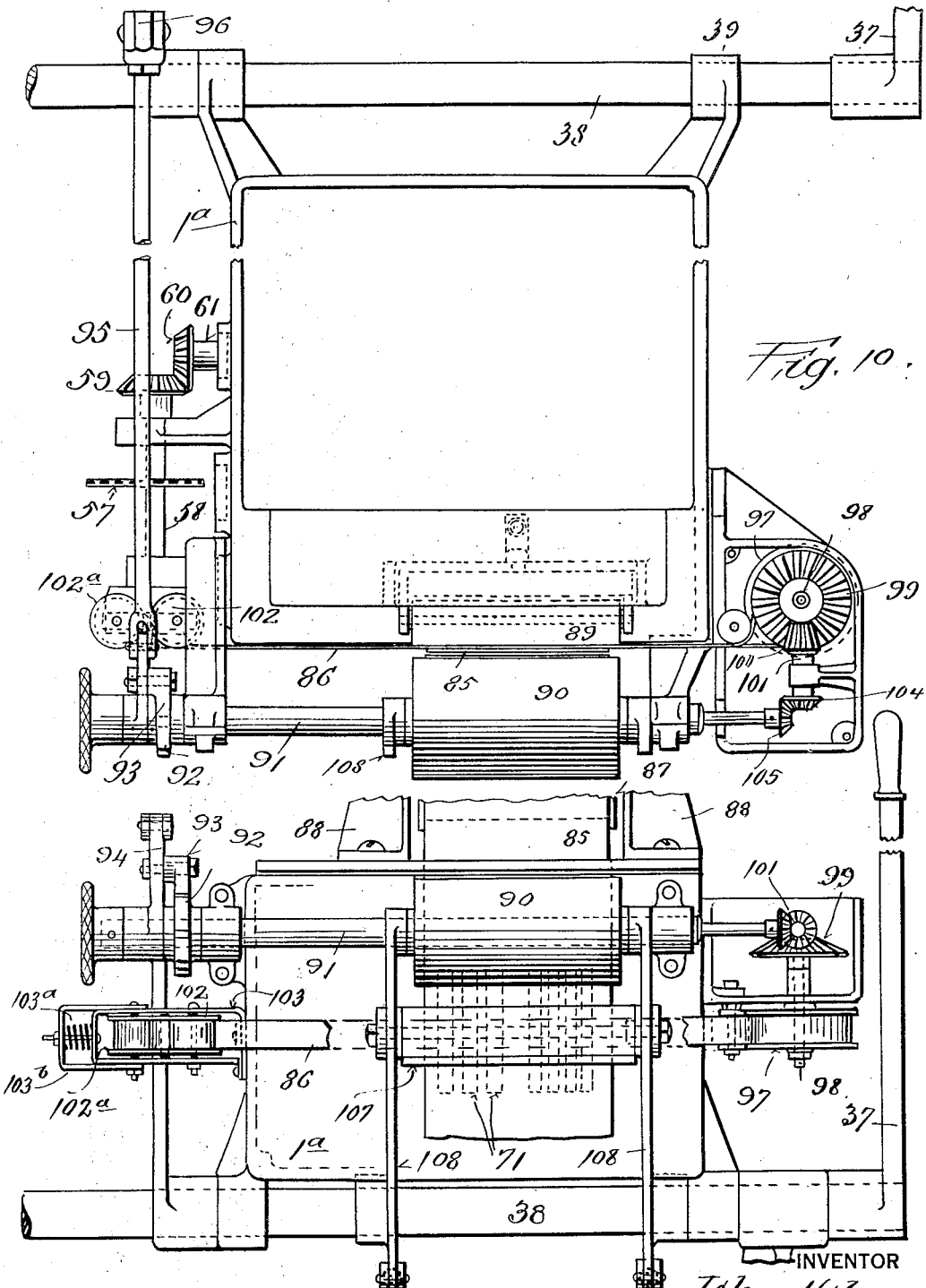

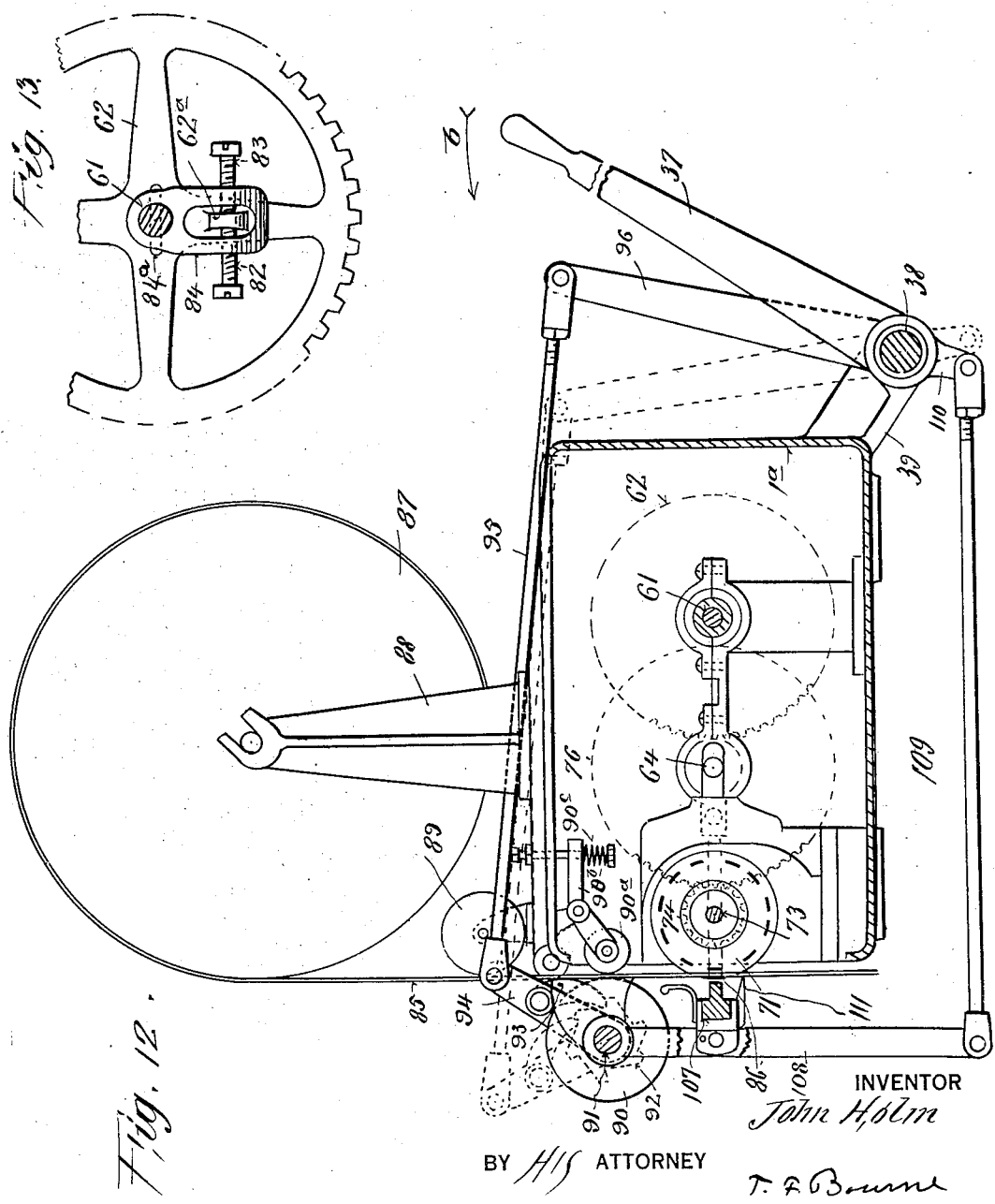

Patented June 14, 1927.

1,632,006

UNITED STATES PATENT OFFICE.

JOHN HOLM, OF BROOKLYN, NEW YORK, ASSIGNOR TO AMERICAN KRON SCALE COMPANY, OF NEW YORK, N. Y., A CORPORATION OF NEW YORK.

RECORDING WEIGHING MECHANISM.

Application filed July 11, 1921. Serial No. 483,714.

In Letters Patent to Osgood, No. 1,198,652, granted Sept. 19, 1916, a weighing mechanism and a printing mechanism are disclosed, wherein manual operation of parts is required to present the printing mechanism in position for printing according to the weight of an article being weighed. My invention is an improvement in the class of weighing and recording scales set forth in the Osgood patent, in that my invention includes power driven means, releasable at will, serving to actuate means for controlling the operation of printing devices automatically in such a way that the operator does not manually set devices to control printing, so that the element of error that may arise from inaccurate setting of printing devices is eliminated.

The object of my invention is to provide means to print or record, on tickets, strips, or the like, the weight of articles being weighed, without interfering with the free operations of the weighing mechanism.

My invention comprises a weighing mechanism, having a shaft provided with an indicator, an arm to be operated by said shaft, a rotative member to engage said arm, power driving means to actuate said member when released, and recording devices operative by said actuating means to present numerals in position to be printed upon tickets or a strip to record the weight of articles being weighed. Said arm and member are operated independently so that the weighing mechanism will not be interfered with by the recording devices.

My invention also comprises novel details of improvement that will be more fully hereinafter set forth and then pointed out in the claims.

Figure 1:
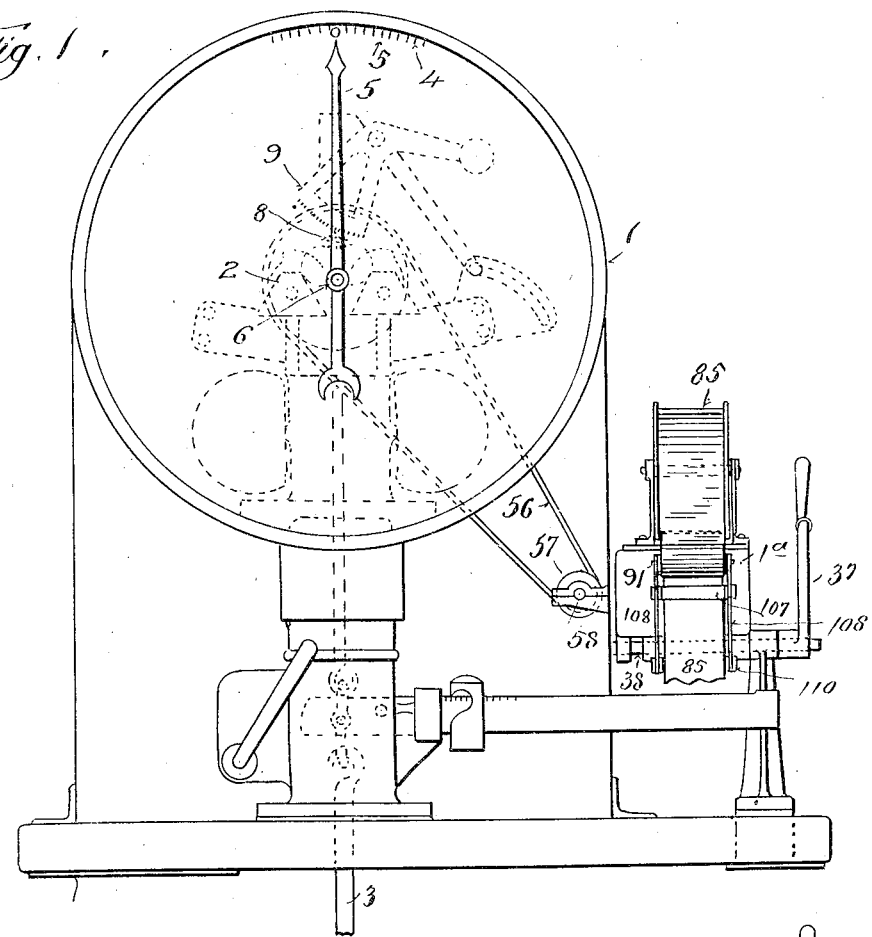
Figure 2:
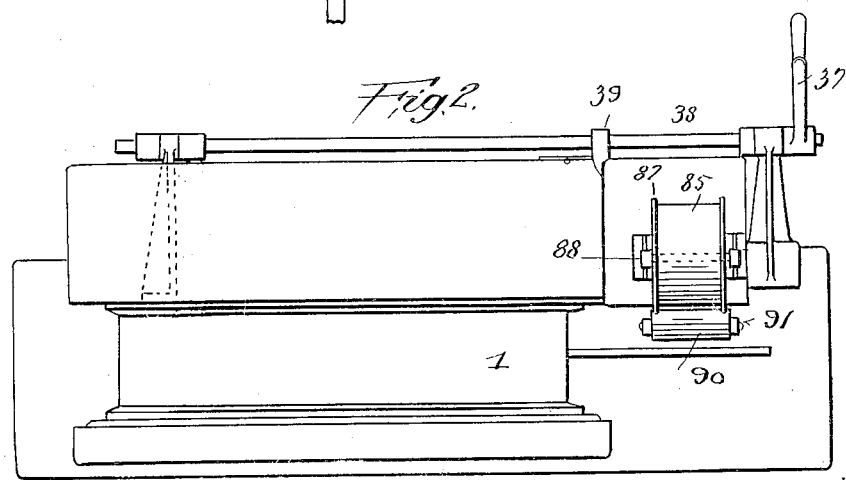
Figure 5:
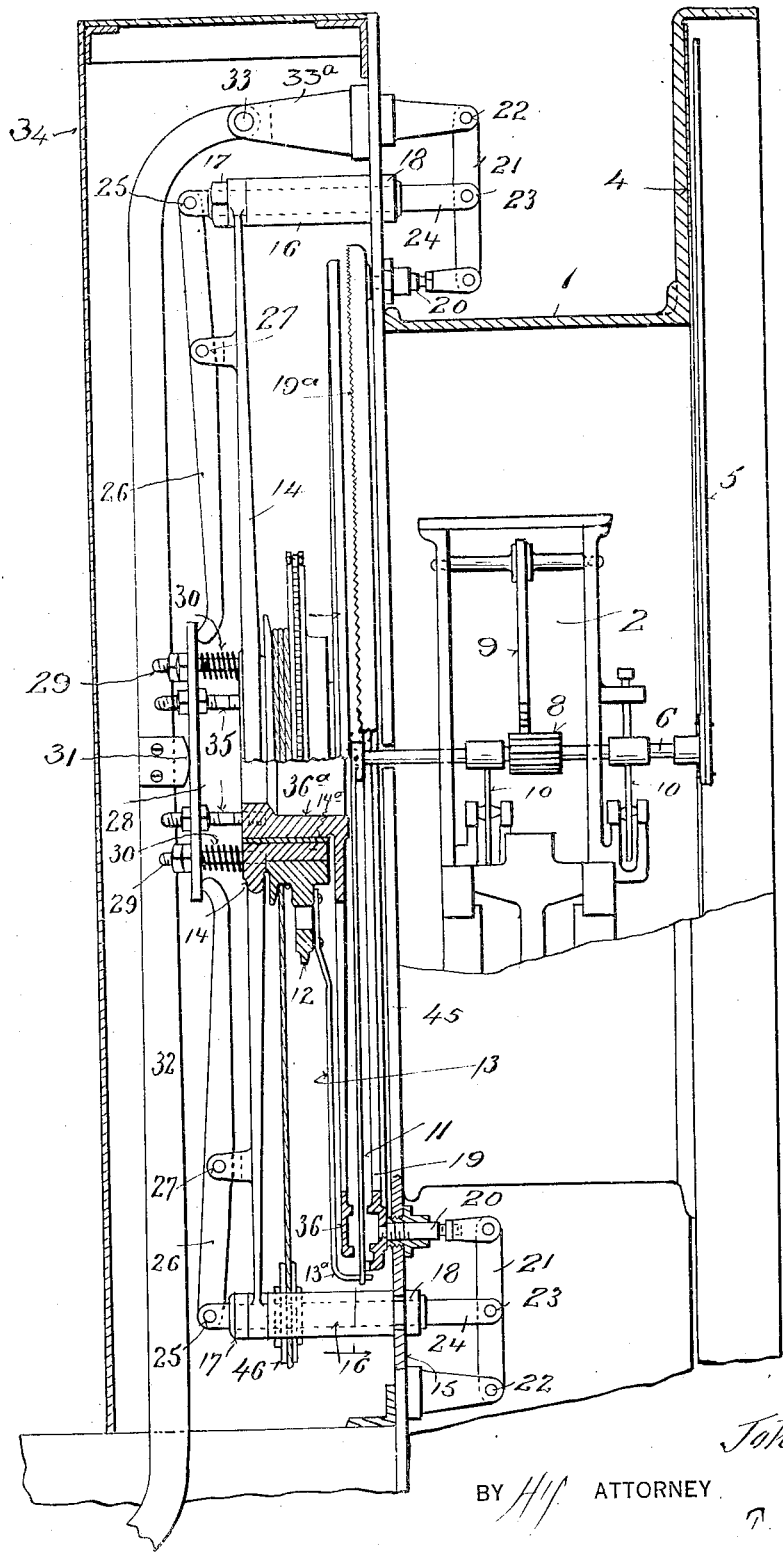
Figure 6:
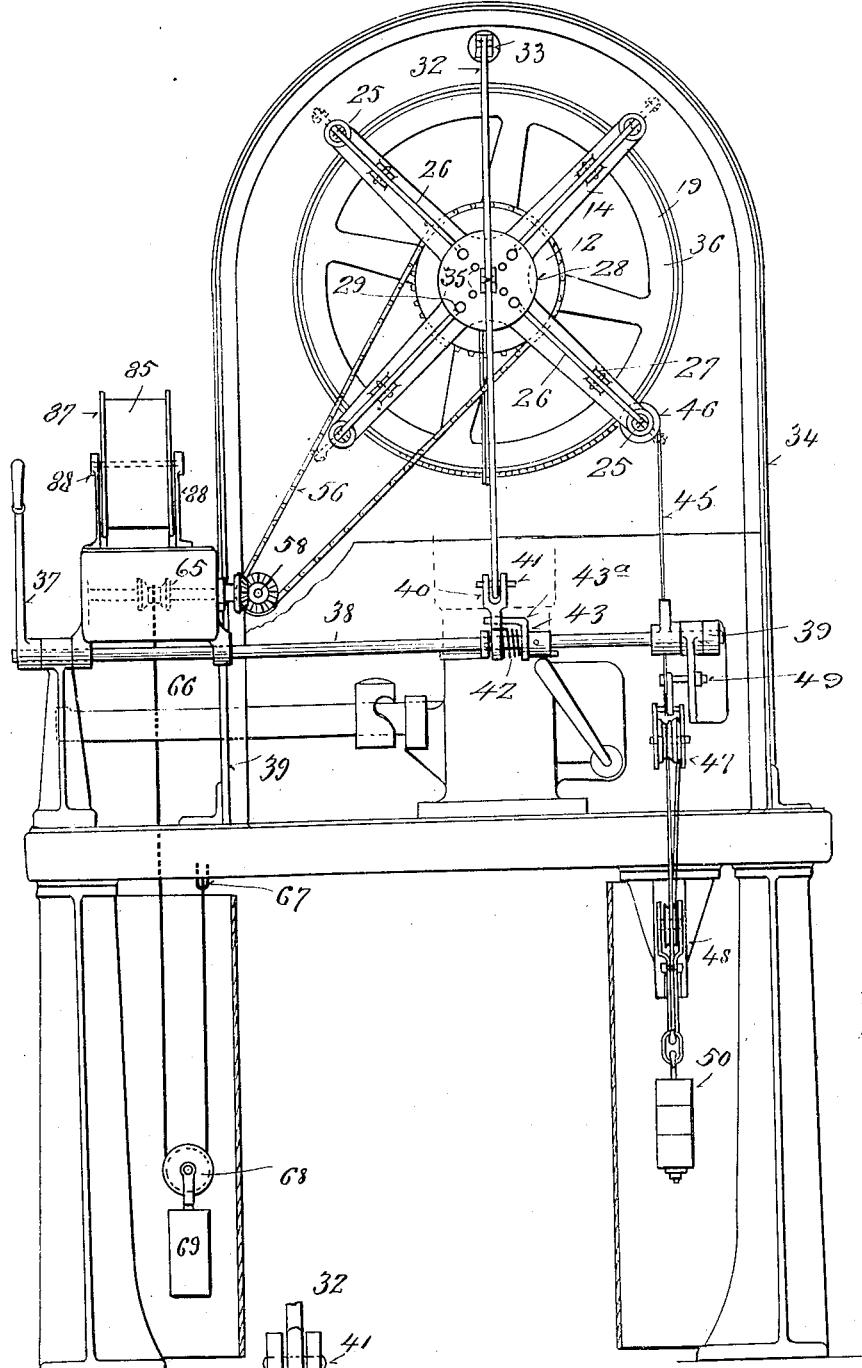
Figure 7:
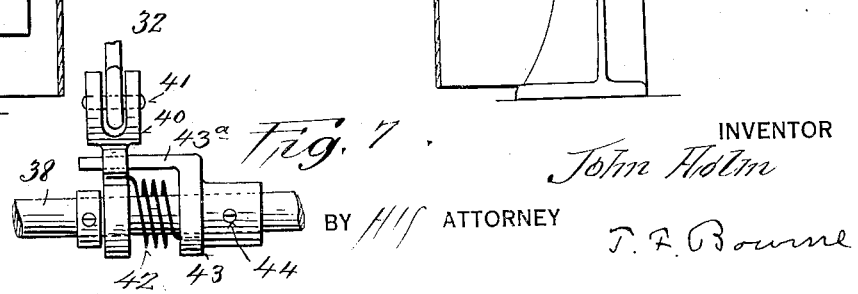

Reference is to be had to the accompanying drawings forming part hereof, wherein Figure 1 is a front view of a weighing mechanism embodying my invention; Fig. 2 is a plan view; Fig. 3 is a side view of Fig. 1; Fig. 4 is an enlarged fragmentary detail; Fig. 5 is an enlarged sectional side view; Fig. 6 is a rear view; Fig. 7 is a detail; Fig. 8 is an enlarged fragmentary front detail view of parts shown on a smaller scale by Fig. 6; Fig. 9 is an enlarged detail plan view; Fig. 10 is a plan view of the recording devices; Fig. 11 is a front view of Fig. 10; Fig. 12 is a sectional view taken on a vertical line which will intersect the casing at its side nearest to the weighing mechanism; Fig. 13 is a detail.

Similar numerals of reference indicate corresponding parts in the several views.

In the accompanying drawings the numeral 1 indicates the casing of any suitable weighing mechanism, indicated generally at 2, and which mechanism may be of any suitable or well known construction, adapted to be operated by a draft rod 3 from a scale platform, pan or the like, of any suitable construction not shown. The weighing mechanism has a dial 4, and a pointer or indicator 5 to sweep over the dial. A shaft 6 of the weighing mechanism carries said indicator as well as a pinion 8 operated by rack 9. Rollers 10 support said shaft, (Fig. 5). If preferred the dial may be carried by shaft 6, in a well known way, instead of indicator 5 on said shaft. A suitable weighing mechanism, with which my improvements are applicable, is set forth in U. S. Letters Patent to J. C. Barrett, No. 1,310,464, granted July 22, 1919.

The shaft 6 actuates an arm 11 to rotate with indicator 5, the arm being shown attached to said shaft. Concentric with shaft 6 is a wheel 12 carrying a member 13 to engage arm 11, shown having a laterally extended end 13$^a$ for the purpose, (Fig. 5). Wheel 12 is shown journaled on hub 14$^a$ of a support or spider 14 shown held upon plate or support 15 of the casing by hollow spacers 16 secured to the spider and to the plate by nuts 17, 18, (Fig. 5). A laterally movable ring 19, having spaced teeth 19$^a$, is supported upon plate 15 by pins 20 slidable in said plate. The pins 20 are pivotally connected to rock arms 21 pivotally carried at 22 upon plate 15 and pivotally connected at 23 with rods 24 slidable in the spacers 16. The rods 24 are pivotally connected at 25 with levers 26 pivotally supported at 27 upon spider 14. The levers 26 bear against a laterally movable plate or disk 28 supported upon spider 14 by pins 29 and normally pressed from the spider by springs 30. The disk 28 bears against a projection 31 on a lever 32 that is pivotally supported at 33 upon a projection 33$^a$ that extends from plate 15, said lever depending through the outer casing 34. The disk 28 has pins 35 slidable through the spider and attached to hub 36$^a$ of a ring 36 that is opposed to ring 19 to grip arm 11 therebetween. The springs normally retain rings 19 and 36 spaced from arm 11 whereby the latter may rotate between said rings. Hub 36ᵃ is slidable in hub 14ᵃ. When arm 11 has been rotated with indicator 5 the requisite distance, according to the weight of an article being weighed, said arm will come to rest between rings 19 and 36, whereupon lever 32 will be operated to push disk 28 which will push ring 36 toward arm 11 and through the medium of levers 26, pins 24, arms 21, and pins 20, lever 32 will push ring 19 toward ring 36, whereby arm 11 will be clamped in set position, the appropriate teeth 19ᵃ serving to centralize said arm with respect to the position of indicator 5. The lever 32 is actuated by means of handle 37 secured on rock shaft 38 journaled on the main casing, which shaft is operatively connected with lever 32. I have shown shaft 38 provided with a loose arm 40 pivotally operative by means of pin 41 with lever 32, a spring 42 bearing against arm 40 and connected to shaft 38 serving to actuate said arm and lever 32 in one direction. Spring 42 is shown connected to a sleeve 43 secured by screw or pin 44 on shaft 38, (Fig. 7), said sleeve having a finger 43ᵃ to actuate arm 40 to restore it. When handle 37 is moved in the direction of arrow $a$ in Fig. 3, the spring 42 will operate arm 40 to actuate lever 32 to push disk 28, and when said lever comes to rest the spring 42 will permit continued rotation of shaft 38 for operation of other devices as a weight for restoring other parts to normal or operative position. When handle 37 is reversed the finger 43ᵃ will restore arm 40 and thereby permit lever 32 to be released from disk 28 to permit separation of rings 19 and 36 to release arm 11, which will occur after the printing operation as hereinafter described.

To cause member 13 to rotate after arm 11 has come to rest with indicator 5, so that said member will be stopped by said arm corresponding to the movement of the indicator, I provide a rope or flexible member 45 which is wound upon wheel 12, (Fig. 5), and shown guided over a pulley 46 journaled on one of the spacers 16, which rope is shown passing over sheaves 47, 48. The sheave 47 is supported at 49, a weight 50 being attached to the sheave 48, (Fig. 6), by means of an interposed lever 51 pivoted at 52 on the main frame, (Fig. 3). Link 54 connected with lever 51 which has its fulcrum at 52 and with an arm 55 secured on shaft 38 permits raising of weight 50 when lever 37 is moved in the direction of the arrow $a$ in Fig. 3, for operating the printing or recording devices. Wheel 12 is shown provided with teeth 12ᵃ receiving a chain 56 which passes over a sprocket wheel 57 on shaft 58 journaled in bearings on the casing 1ᵃ. Shaft 58 has a gear 59 in mesh with gear 60 on shaft 61 having a gear 62 in mesh with pinion 63 on shaft 64 provided with pulley 65, (Fig. 9), that receives a cord or rope 66 shown having its outer end attached to the main frame at 67 and provided with a pulley 68 supporting a weight 69, (Fig. 6). The arrangement is such that when weight 50 is lifted the weight 69, through the gearing described, will cause rotation of wheel 12, whereby member 13 will be rotated to engage arm 11 after the latter has been gripped between rings 19 and 36, to correspondingly limit rotation of said arm according to the weight of the article, the weight 69 serving also to actuate the recording or printing wheels to be referred to. When weight 50 is released, it, by preponderance of weight, will rotate wheel 12 reversely to restore member 13 to the normal position and raise weight 69 for another operation.

A recording or registering instrument, of any well know character, is indicated at 70, having any desired number of numbering wheels 71 (Figs. 9 and 12) shown retained in housing 1ᵃ. The shaft 73 of instrument 70 is shown provided with pinions 74, 75, in mesh with gear 76 secured on shaft 64 (Fig. 9), whereby when shaft 64 is actuated by the operation of weight 69 the number wheels 71 will be operated accordingly. For the purpose of accuracy pinion 74 is secured to shaft 73 and pinion 75 is loose on said shaft and is connected thereto by means of spring 77 one end of which is secured at 78 to the hub of pinion 75, the other end of said spring being secured by pin 79 to a collar at 80 secured in a adjusted position on shaft 73 by screw 81, (Fig. 9). The tension of spring 77 tends to keep the pinions 74, 75 snugged in the teeth of gear 76 to prevent lost motion. For the purpose of effecting accurate relation of the gearing with respect to member 13 the gear 62 is loose on shaft 61 and provided with a lug 62ᵃ, (Figs. 9 and 13), opposed by screws 82, 83, carried by an arm 84 secured by pin 84ᵃ on shaft 61. By setting the screws 82, 83 as desired the relation of gear 62 to shaft 61 may be adjusted and set for producing accurate relation in the gearing between arm or member 13 and shaft 73.

Means as partially illustrated by Fig. 12 are provided to feed one or more strips of paper or the like 85 in front of the printing wheels 71, as well as an ink ribbon 86 between the printing wheels and the strip. The strip 85 is shown carried upon a reel 87 rotatively supported on brackets 88 secured upon the casing 1ᵃ above the printing wheels, to depend in front of the latter. A guide roll for the strip 85 is shown at 89, and a feed roll for the strip is shown at 90, adapted to press the strip against a roll 90ᵃ on a pivoted arm 90ᵇ pressed by spring 90ᶜ to grip the strip. Roll 90 is carried by shaft 91 journaled in bearings on casing 1ª, (Figs. 10, 11 and 12), and provided with means to rotate the same step by step as shaft 38 is rocked. I have shown a ratchet wheel 92 on shaft 91 to be actuated by pawl 93 carried by rock arm 94 journaled on shaft 91 and connected by link 95 with arm 96 secured on shaft 38, (Fig. 12). The ink ribbon 86 winds around spool 97 carried by shaft 98 journaled on the casing 1ª and shown having gear 99 in mesh with pinion 100 on shaft 101 journaled on said casing, (Figs. 10, 11). Said ribbon passes from reels 102, 102ª, journaled on bracket 103 carried by casing 1ª. A spring 103ª maintains tension on ribbon 86 by pushing strap 103ᵇ connected to reel 102ª, Fig. 11. When shaft 98 is rocked the ribbon will be fed around spool 97. The arrangement provides two ribbon strips 86 so that two paper strips 85 may be simultaneously printed, one of the ribbon strips 86 passing between the two paper strips 85 and the other ribbon strip 86 will pass between one of the paper strips 85 and the type wheels 71. Shaft 101 has a gear 104 in mesh with gear 105 on shaft 91 for rotating spool 97. Any other desired ribbon feed devices may be used. Opposite the printing wheels and ribbon is an impression member 107 shown supported by arms 108 journaled upon shaft 91 and connected by links 109 with projections 110 on shaft 38, (Figs. 1, 11 and 12). A cutter is shown at 111 carried with impression member 107 so that the printed portion of strip 85 may be torn off to produce the desired ticket showing the weight of the article being weighed. Two or more strips 85 may be simultaneously printed.

The operation may be described as follows: When the parts are in their normal position the free end portion of strip 85 will be presented in front of the printing wheels 71, the handle 37 will be in the rearward position, (Figs. 3 and 12), the indicator 5 will be at zero, and the arm 11 and member 13 being at rest in relation to indicator 5, (Fig. 5). When a weight is placed upon the platform or pan the indicator 5 will be rotated in front of the scale 4 to indicate the weight of the article, and arm 11 will be correspondingly moved from member 13. When the indicator and arm 11 come to rest the handle 37 will be drawn in the direction of the arrow $a$ in Fig. 3, whereupon finger 40 will be operated to cause lever 32 to push disk 28 to cause rings 19 and 36 to grip arm 11 and retain it in the position set by the weight of the article, and such movement of handle 37 will cause raising of weight 50 to permit weight 69 to rotate wheel 12 by means of the gearing between shafts 64 and 58 and by chain 56, and whereby the gearing between shaft 64 and shaft 73 will rotate the latter to cause the printing wheels 71 to be rotated the proper extent as limited by the engagement of member 13 with the arm 11, to indicate on said wheels the weight of the article being weighed. Continued movement of handle 37 will cause printing member 107 to impress strip 85 against ribbon 86 to print the number from the printing wheels upon the strip, during which movement of handle 37 the pawl 93 travels freely over ratchet 92. Upon the reverse movement of handle 37 the feed roll 90 will be rotated to feed the printed strip below cutter 111 in position to be pulled off as a printed ticket, lever 32 and weight 50 will be released, whereby said weight will cause wheel 12 to rotate reversely to carry member 13 back to its normal position, and re-wind rope 66 on pulley 65, and by the release of lever 32 the rings 19 and 36 will be separated, to permit arm 11 and indicator 5 to return to normal in the usual way. The number wheels may be of the variety that are returned to zero when the operating shaft 73 is reversed, or by restoring the printing wheels by hand operation. At 70ª is indicated a numbering device of any well known character adapted to indicate the number of times the printing mechanism is utilized or the accumulation of the weights for a period, the shaft 70ᵇ of which instrument may be operated from shaft 73 in any desired manner, not shown. The numbers on both instruments 70 and 70ª may be simultaneously printed upon strip 85. With two or more strips 85 printed, one may be given to the customer and the other may be retained for a permanent record, either in strip form, without tearing it off at the cutter 111, or torn off in ticket form, as preferred.

My invention enables the weighing operations to be carried out in a usual way without interference by the printing or recording devices, and permits the latter devices to be operated whenever desired without dependence upon actuation by the weighing mechanism, so that neither will interfere with the other, and yet the recording devices are dependent upon the position of the indicator 5 and arm 11 for proper recording of weight of articles being weighed.

Changes may be made in the details of construction and arrangements of parts set forth, within the scope of the appended claims, without departing from the spirit of my invention.

Having now described my invention, what I claim is:—

1. In a recording weighing mechanism of the class set forth, the combination of weighing mechanism having an indicator and an arm operative therewith, of a member normally free from said arm adapted to cooperate therewith, a wheel to operate said member, a plurality of power driving means to actuate said wheel in opposite directions, one of said power means controlling the other power means, means normally restraining said power driving means adapted to be released at will, printing devices, and means controlled by said wheel to actuate said printing devices.

2. In a recording weighing mechanism of the class set forth, the combination of weighing mechanism having an indicator and an arm operative therewith, of a member normally free from said arm adapted to cooperate therewith, a wheel to operate said member, a plurality of power driving means to actuate said wheel in opposite directions, one of said power means controlling the other power means, means normally restraining said power driving means adapted to be released at will, printing devices, means controlled by said wheel to actuate said printing devices, and means to retain and release said arm for cooperation with said member.

3. The combination of weighing mechanism having an indicator and an arm operative therewith, of a member normally free from said arm adapted to cooperate therewith, a wheel to operate said member, a weight operatively connected with said wheel to rotate it in one direction, gearing connected with said wheel, printing devices operative by said gearing, a second weight to actuate said gearing to rotate the wheel in the direction opposite to its rotation by the first named weight, and means to raise the first named weight to permit the second named weight to operate said gearing and to restore the first named weight to rotate said wheel and overbalance the second named weight.

4. The combination of weighing mechanism having an indicator and an arm operative therewith, of a member normally free from said arm adapted to cooperate therewith, a wheel to operate said member, a weight operatively connected with said wheel to rotate it in one direction, gearing connected with said wheel, printing devices operative by said gearing, a second weight to actuate said gearing to rotate the wheel in the direction opposite to its rotation by the first named weight, means to raise the first named weight to permit the second named weight to operate said gearing and to restore the first named weight to rotate said wheel and overbalance the second named weight, and means to retain and release said arm for cooperation with said member.

5. In a recording weighing mechanism of the class set forth, the combination of weighing mechanism having an indicator and an arm operative therewith, of a member normally free from said arm adapted to cooperate therewith, a pair of rings opposing said arm, a wheel carrying said member, means to cause the said rings to grip and release said arm, power driving means to actuate said wheel, said first named means controlling said power driving means, printing devices, and gearing operative with said wheel to actuate said printing devices.

6. The combination of weighing mechanism having an indicator and an arm operative therewith, of a member normally free from said arm adapted to cooperate therewith, a pair of rings normally spaced from said arm, means to cause said rings to grip said arm, a lever to operate said means, a wheel to operate said member, automatic means to cause rotation of said wheel while said rings grip said arm, said lever controlling said automatic means, printing devices, and means operative with said wheel to actuate said printing devices.

7. The combination of weighing mechanism having an indicator and an arm operative therewith, of a member normally free from said arm adapted to cooperate therewith, a pair of rings opposed to said arm, levers operatively connected to one of said rings, a disk operatively connected to the other ring adapted to operate said lever, a lever to actuate said disk, a wheel to operate said member, means to operate said wheel, means to release said operating means and actuate said lever for causing the rings to grip said arm, printing devices, and gearing to actuate said printing devices and wheel simultaneously.

8. The combination of weighing mechanism having an indicator and an arm operative therewith, of a member normally free from said arm adapted to cooperate therewith, rings to grip and release said arm, arms connected with one of said rings, levers to operate said arms, a disk to operate the other ring and said levers, a lever to actuate said disk, a wheel to operate said member, automatic means to operate said wheel in opposite directions, printing devices, and means controlled by said wheel-actuating devices to operate said printing devices.

9. The combination of weighing mechanism having an indicator and an arm operative therewith, of a member normally free from said arm adapted to cooperate therewith, means to grip and release said arm, a wheel to operate said member, printing devices, means to simultaneously automatically rotate said printing devices and the wheel to cause the member to engage the arm to control rotation of the printing devices, means to automatically reverse the rotation of said wheel to carry the member away from said arm, and means to release said automatic means successively.

10. The combination of weighing mechanism having an indicator and an arm operative therewith, of a member normally free from said arm adapted to cooperate therewith, means to grip and release said arm, a wheel to operate said member, printing devices, means to simultaneously automatically rotate said printing devices and the wheel to cause the member to engage the arm to control rotation of the printing devices, means to automatically reverse the rotation of said wheel to carry the member away from said arm, and means to release the first named automatic means when said arm is gripped and to release said second named automatic means when the arm is released.

11. The combination in weighing and recording mechanism having an indicator and an arm operative therewith, of a member normally free from said arm adapted to cooperate therewith, power driven means tending to automatically actuate said member, means for retaining inactive the power driven means, printing devices to be operated by said means, impressing means to cooperate with said printing devices, and operator operated means for actuating said retaining means to release the power driven means therefrom and to move said impressing means to printing position.

12. The combination of weighing mechanism having an indicator and an arm operative therewith, of a member normally free from said arm adapted to cooperate therewith, means tending automatically to actuate said member, printing devices to be operated by said means, impressing means to cooperate with said printing devices, and means movable in one direction to release said automatic means to actuate said member and operate said impressing means and operative in a reverse direction to reset said automatic means.

13. The combination of weighing mechanism having an indicator and an arm operative therewith, of a member normally free from said arm adapted to cooperate therewith, means tending automatically to actuate said member, means preponderating in power to actuate said automatic means to reset it, means to remove said preponderating means from counteraction on said automatic means and to restore said preponderating means into cooperation with said automatic means, and recording devices operative by said automatic means.

14. In a weighing-recording scale, an indicator, an arm movable with the indicator, a power actuated rotatable member, recording mechanism, means connecting the rotatable member with the recording mechanism, and an operator operated means for actuating the recording mechanism and upon the release thereof operating upon mechanism which will move the weighing mechanism to initial position.

15. In combined weighing and recording mechanism, weighing mechanism having an indicator and a member which is movable therewith, means normally free from the indicator and said member, a power actuated frame rotatable to accord with the position of the indicator, recording means, operator operated means for actuating the recording means and after such actuation to release the means for actuating the weighing mechanism, also serving to restore the power actuated frame to initial position.

16. In combination, a weighing mechanism having a revoluble power actuated member movement thereof being in accord with the position of a weight indicator of the weighing mechanism, typing means, means for actuating from the revoluble power actuating mechanism said typing means, a manually operated lever for effecting operation and producing a record from the typing means and thereafter restoration of the weighing mechanism to initial position.

17. In a weighing apparatus, the combination of an indicator which is mounted on a shaft, said shaft being connected with weighing means, an arm also mounted on the shaft carrying the indicator, power driven rotatable means movement of which is controlled by the arm, a printing couple which is set automatically by the power driven rotatable means, operator operated means for actuating the printing couple to record and to then restore the weighing means to initial position by reverse movement of the weighing instrumentalities controlled by the second power driven means.

Signed at New York city, in the county of New York and State of New York, this 6th day of July, A. D. 1921.

JOHN HOLM.